Oct. 31, 1967  R. BINI  3,349,725
CONTINUOUS BREAD-MAKING MACHINE
Filed Nov. 22, 1965   2 Sheets-Sheet 1
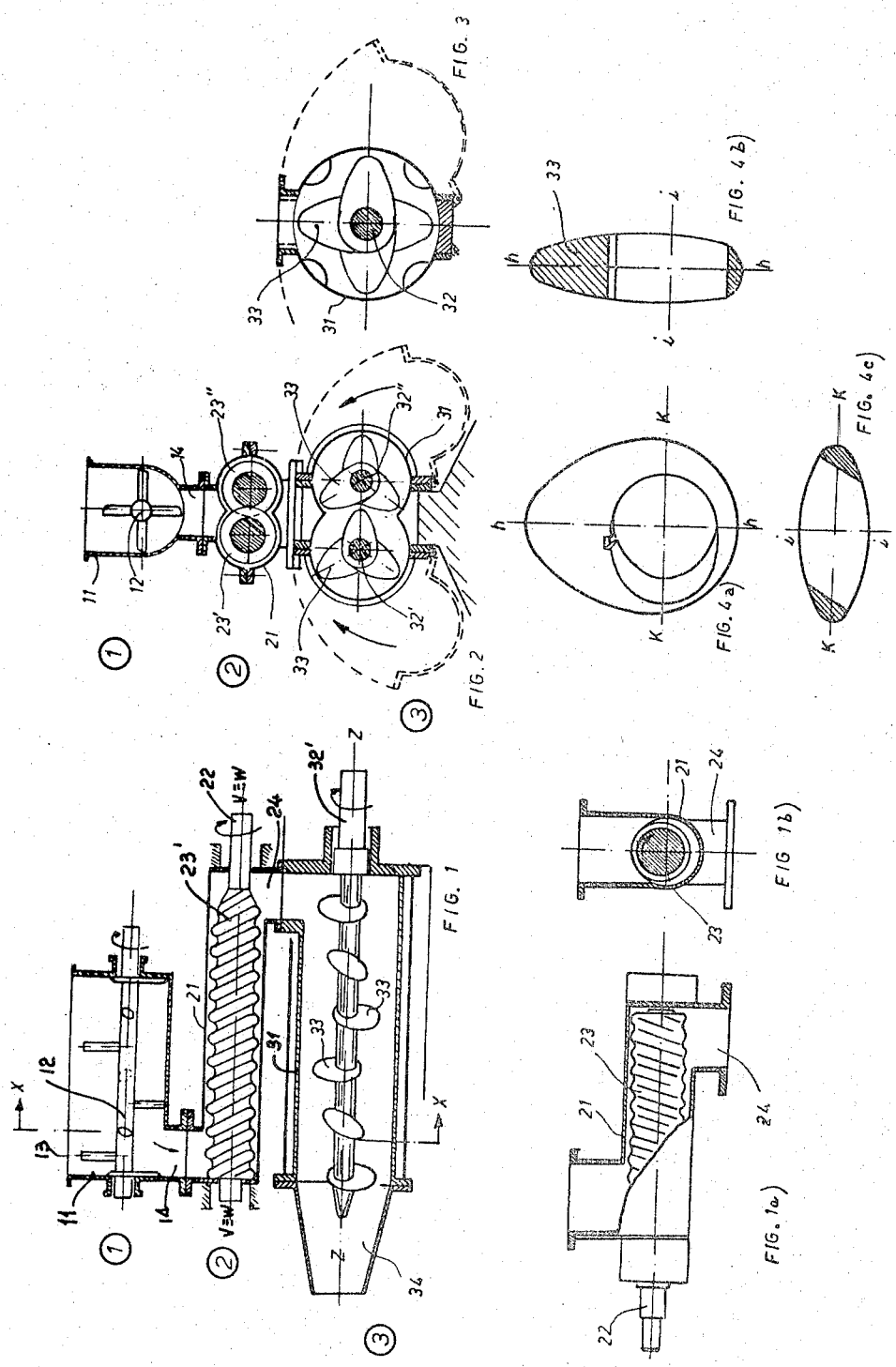

Oct. 31, 1967 R. BINI 3,349,725
CONTINUOUS BREAD-MAKING MACHINE
Filed Nov. 22, 1965 2 Sheets-Sheet 2
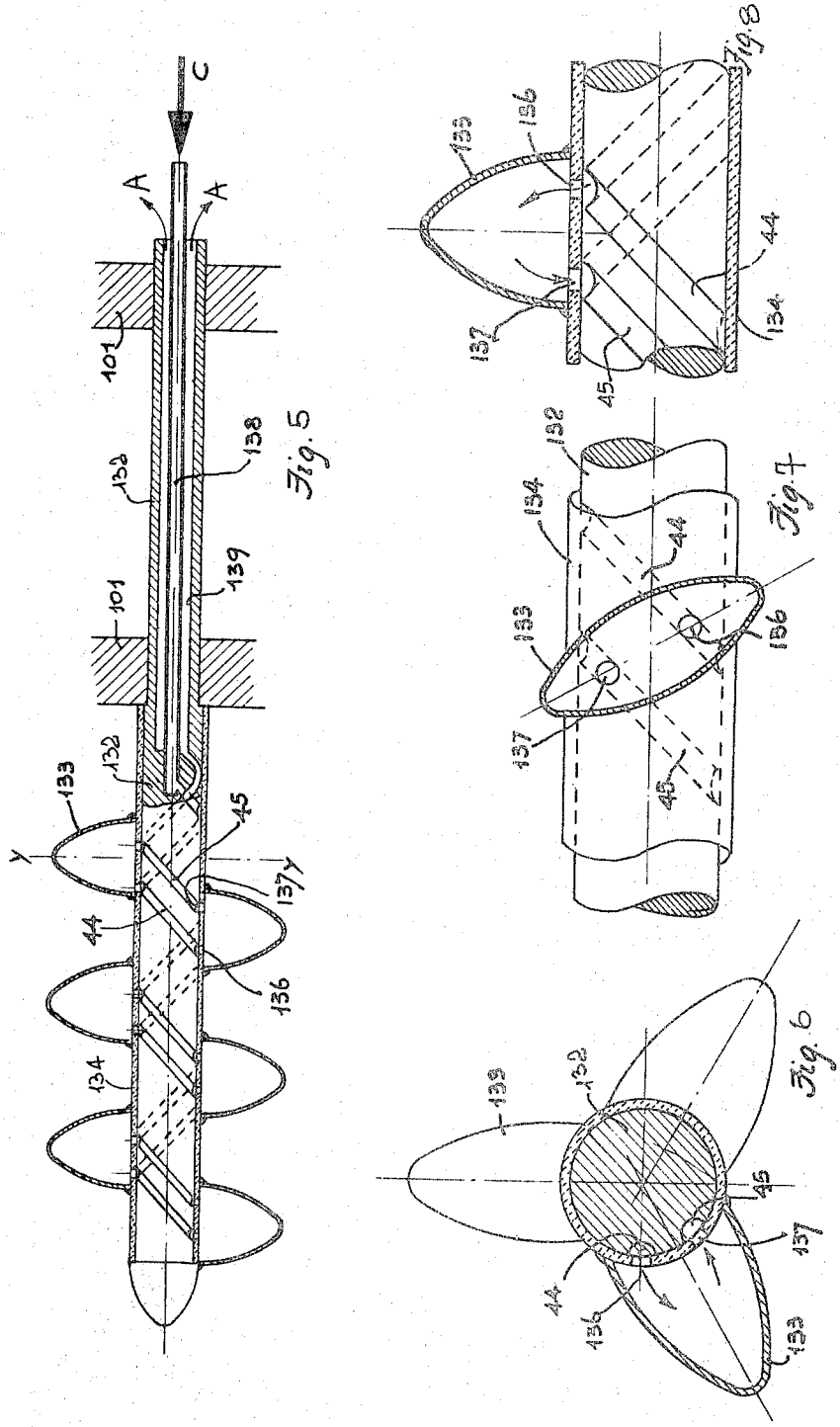

United States Patent Office 3,349,725
Patented Oct. 31, 1967

3,349,725
CONTINUOUS BREAD-MAKING MACHINE
Riccardo Bini, Via Lungo Leno Sinistro 19,
Rovereto, Italy
Filed Nov. 22, 1965, Ser. No. 508,996
Claims priority, application Italy, Nov. 21, 1964,
739,773/64; Mar. 30, 1965, 7,220/65
8 Claims. (Cl. 107—36)

ABSTRACT OF THE DISCLOSURE

A continuous bread-making machine which prevents the destruction of the fibrous bundles in the reticulate texture formed by the gluten. It is composed of three superimposed elements, namely, a blender with shaft-supported blending paddles, a first mixer with one, and preferably two screw feeders, and a pressure mixer with a pair of shafts having thereon helicoidally developed vanes of lenticular shape. The vanes are internally cooled with, for example, water.

---

The present invention relates to bread-making machines and, particularly, to a continuous and simplified bread-making machine.

The social evolution of modern life has increasingly imposed upon bread makers the necessity of centralizing the manufacture of this basic food in plants especially suitable for the production of bread, which plants allow not only a reduction in the processing costs but also a complete control on the hygienic and sanitary aspects of the manufacturing facilities, difficulty controllable in small and decentralized workshops. The local and artisan-like manufacture of a multitude of varied shapes of breads is little by little being replaced, due to the urban concentration of population, by the large and industrialized mass production of standard bread shapes and sizes. Accordingly, there is a trend toward the use of machinery suitable for the continuous shaping and baking of large quantities of bread at high rates of production.

Bread-making machines have been known for a long time, but the product obtained from their continuous operation is of lower quality than that obtained by the artisan in former times, and, furthermore, these machines are composed of an unnecessarily large number of elements and parts. The greatest difficulties to be overcome in the achievement of a satisfactory mechanical mixing, reside in the homogeneity, uniformity and sound aeration of the bread, thus avoiding the yielding of the fibers of the dough during working. In other words, it should not be permitted that the fibrous bundles formed by the gluten and the reticulate texture created by the interlacing of the bundles be destroyed by the mechanical action of the mixer, thus demolishing the scaffolding structure which encloses, uniformly distributed, the starchy component of the flour.

To achieve the above-stated results, the mechanical manipulation of the dough must be delicately performed and it must imitate the well-known classic manual methods of mixing and kneading. Concurrently it is also necessary to minimize or obviate overheating of the mechanical components which is ever more present as the production rate and speed of the machine is increased.

It is, therefore, an object of the present invention to provide for a device which materializes efficiently the above-expounded requirements, that is, the minimization of the yielding of the proteic fibers, the preservation of the reticular bread mass and the obviation of overheating of the mechanical components of the device.

These and other objects and advantages of the invention will become apparent from the following description of the embodiments thereof and from the accompanying drawings.

Briefly stated, the machine of the present invention consists of the assembly and operational interconnection of a blender 1, a first mixer 2 and a pressure mixer 3. The blender serves the function of homogeneously admixing the raw materials or ingredients necessary, that is, water, salt, flour and yeast. The three components are mounted in cascade fashion and, as it is well understood, are preceded by suitable hoppers and measuring means and followed by suitable cutting and sizing means. With reference to the figures:

FIGURE 1 is a schematic, sectional elevation illustrating the three main components of the machine of the invention. These three components are superposed on one another so that their respective longitudinal axes are contained in a single vertical plane;

FIGURES 1a and 1b show in longitudinal and transversal sectional views a variance of the center component 2 of the machine;

FIGURE 2 illustrates sectionally the bottom component 3 of the machine, taken along the lines x—x of FIGURE 1;

FIGURE 3 shows a variance of the propulsion means of the bottom component 3 of the machine;

FIGURES 4a, 4b and 4c show three views of the means of FIGURE 3, said means consisting of elliptically lenticular elements mounted eccentrically on the shaft of the bottom component 3 of the machine; and FIGURES 5, 6, 7 and 8 represent a variance in the working of the mixing elements 32'–33 and 32"–33 positioned within the cylindrical and bi-lobed container 31. This variance permits the cooling of the central nucleus of the mixed bread mass during its travel within the enclosure 31. Particularly, FIGURE 5 shows the longitudinal median section of a cooled shaft. FIGURE 6 shows a section thereof taken along the lines y—y of FIGURE 5. FIGURE 7 shows a particular section of a vane 133 which replaces the original wing element or vane 33 of FIGURE 1. Finally, FIGURE 8 shows a section of the shaft longitudinally taken and the sleeve 134 surrounding it.

Referring now to FIGURES 1 through 4b, it can be seen that the first operation of the device of the invention is effected by blender 1, which is composed of a vessel or container 11, longitudinally crossed by shaft 12 having radial vanes 13. The initial blending is necessary to obtain a uniform admixing of the various ingredients and in the quantities desired by the user. Discharge outlet 14 of container 11 is connected to the feed inlet of the mixer 2 which mixer includes a tubular container 21. Cross-sectionally, the container 21 resembles a reclined figure eight within which and along the two axes v–w (preferably horizontal) are located, longitudinally paired, the twin cylinders 23′ and 23″. These cylinders have their outer surfaces particularly shaped so as to obtain a helicoidal screw-feeding of the bread paste. The profile of these cylinders varies depending on the various types of paste or dough to be worked. Accordingly, modifications may be effected in the amplitude of the convolutions, in the radial relationship of the threading, etc. as seen, for example in FIGURES 1a and 1b. Furthermore, cylinders 23′–23″ (positioned with their axes coinciding with the axis of the container 21) may be substituted by a single helicoidally-shaped cylinder positioned eccentrically with respect to the axis of the container (see FIGURES 1a and 1b).

The profile of the cylinders on the pivoting elements 22 is carefully studied so as to permit the repeated mixing, pressing and expansion of the bread mass also against the inner walls of the container 2. To the mixer 2 is connected the pressure mixer 3 which comprises a container 31 sectionally shaped as a bi-lobed cylinder and containing two jump-shafts (alberi a sherlzo) 32′–32″ to which are connected the vanes 33, in accordance with the movement of a cylindrical helicoidal tracing. This particular tracing and the position of the vanes 33 are such that the shafts 32′ and 32″, rotating in opposite direction, cause the vanes 33 to converge toward the center line of the container 31. Therefore, the pressure exerted by the vanes is directed toward the outlet 34. It should be noted that the vanes 33 of the shafts 32′–32″ of the pressure mixer 3, as shown in FIGURES 4a, 4b and 4c, are lenticularly shaped and obliquely hollow so as to be mounted eccentrically with respect to shaft 32 and to have their lateral surfaces obliquely positioned with respect to the axis z—z of the shaft 32. The abovementioned figures illustrate said vanes in frontal view and cross-sectionally along two planes h—h and k—k, normal to each other.

The oblique positioning of the lateral surfaces of the vanes 33 is such that the push exerted upon the bread mass is directed outwardly through the outlet 34.

The operation of the device of the present invention, briefly, is as follows:

After the various ingredients of the bread have been duly measured and have been fed to the container 11 of the blender, they travel through the entire length thereof and are discharged through outlet 14 into the first mixer 2. The first mixing takes place in this component of the device during the travel of the mass toward outlet 24 and said mixing renders the rass uniform due to the numerous kneading actions to which it is subjected while passing through the limited openings existing between the helicoidal surfaces of the screw-feeders 23′ and 23″ and between the convolute 23 and the inner surfaces of the container 21. From the mixer 2 and through outlet 24, the bread mass is fed to the pressure mixer 3 and is forced by the lenticular vanes 33 to delicately move toward and, finally, exit from outlet 34.

As stated hereabove, it is necessary to minimize or obviate, during the mechanical operation, the overheating of any component of the device. To this purpose, the bi-lobed container 31 of the pressure mixer may be enveloped by a sealed sleeve and in the space or cavity thus created cooling means, such as water, may be introduced. This heat-exchanging arrangement is similar to that employed in devices of this type, but, besides not solving completely the problem faced, it requires complicated operational and structural arrangements. It, furthermore, does not satisfactorily cool the very center of the paste or bread mass, as required.

Thus, the present invention provides for a novel solution of the problem. It utilizes hollow shafts provided with hollowed vanes. These may be readily prepared by stamping of the stainless steel sheets subsequently welded to one another. The inner cavities of the assembled component parts are connected in fluid communication with a source of cooling medium. This arrangement of heat-exchanging has been found to be very adequate to the operation of the device of the invention, without the addition of auxiliary cooling means. Briefly, the heat-exchanging is effected by means of a pair of twin shafts.

Each individual shaft is composed of a single-piece core 132, the terminal portion of which is supported by the framework 101 by means of bearings (not shown). The core 132 of the shaft has a cylindrical cavity 139 within which is inserted a tubular conduit 138. The outlet of conduit 138 is corresponding in juxtaposition with one of the channels indicated with numerals 44 and 45. These channels are parallel to each other in accordance with a helicoidal spiral developed on the surface of the core 132. The core 132 is inserted within the sleeve 134, cylindrically shaped and adjacent thereto and the outlet of conduit 138 corresponds to the inlet of one of said channels (for example, of channel 44).

Within the sleeve 134 and separate from each other are the openings 136 and 137, corresponding to the bases of each of the vanes 133.

It should be noted that, while the central conduit 138 is connected directly to the source of cooling medium, in fluid communication therewith (C), the conduit 139 is freely connected with a discharging point (A). Conduit 139 is cross-sectionally an annulus enclosed between conduit 138 and the walls of the core 132.

From the above, it may be readily seen that the cooling medium fed to conduit 138 is forced, after traveling therethrough, to enter the ascending channel 44 and to travel therethrough until, partially exiting through opening 136 (see FIGURE 6) of sleeve 134, it fills the inner cavity of the vane 133. After vane 133 is filled, the cooling medium exits through opening 137 of the sleeve and enters the descending channel 45, and finally exits through 139. This takes place with respect to each one of the hollow vanes during the heat-exchanging operation, and, as a result, the inner mass of the bread dough is properly and satisfactorily cooled.

What is claimed is:

1. A continuous bread-making machine which comprises a blender for uniformly admixing the ingredients required in the product, a first mixer suitably provided with at least one screw feeder, and a pressure mixer suitably provided with vanes, said blender, first mixer and pressure mixer being in cascade-type communication among themselves, wherein said pressure mixer is composed of: a tubular container within which rotate two shafts, said shafts having axes parallel and symmetrical with respect to the longitudinal axis of said container; and helicoidally developed vanes fixedly positioned on said shafts and having lenticular shape and having an oblique opening with respect to their surfaces.

2. A continuous bread-making machine, according to claim 1, wherein said screw feeder has its longitudinal axis eccentrically positioned with respect to the longitudinal axis of said first mixer.

3. A continuous bread-making machine, according to claim 1, wherein said vanes of said pressure mixer are hollow and in fluid communication with a source of cooling medium through a hollow shaft and hollow channels provided on the surface of said shaft.

4. A continuous bread-making machine, according to claim 3, wherein one channel is in fluid communication with a source of cooling medium and another channel is in fluid discharge communication, said discharge being obtained by means of cavity between said one channel and the shaft.

5. A continuous bread-making machine, according to claim 3, wherein said vanes are fixedly connected to a sleeve enveloping a portion of the shaft and are provided with two openings therein, each of said openings being in fluid communication with one of said channels.

6. A continuous bread-making machine, according to claim 1, wherein the respective longitudinal axes of said blender, first mixer and pressure mixer are superimposedly contained within a single vertical plane.

7. A continuous bread-making machine, according to claim 1, wherein said first mixer is provided with two screw feeders enclosed within a container which cross-sectionally resembles a reclined figure eight.

8. A continuous bread-making machine, according to claim 1, wherein said tubular container of said pressure mixer is a cross-sectionally bi-lobed cylinder and said shafts therein are jump shafts.

References Cited

UNITED STATES PATENTS

| | | | |
|---|---|---|---|
| 3,035,532 | 5/1962 | Braibanti et al. | 259—69 |
| 3,125,968 | 3/1964 | Baker | 107—30 |
| 3,155,056 | 11/1964 | Smith et al. | 107—36 |
| 3,164,107 | 1/1965 | Oakes et al. | 259—21 X |
| 3,216,375 | 11/1965 | Ernst | 259—41 X |

WILLIAM I. PRICE, *Primary Examiner.*